March 26, 1929.   G. E. COOPER   1,706,842
WELDING MACHINE
Filed June 7, 1924   4 Sheets-Sheet 1

Inventor
G. E. Cooper
by
Attorney

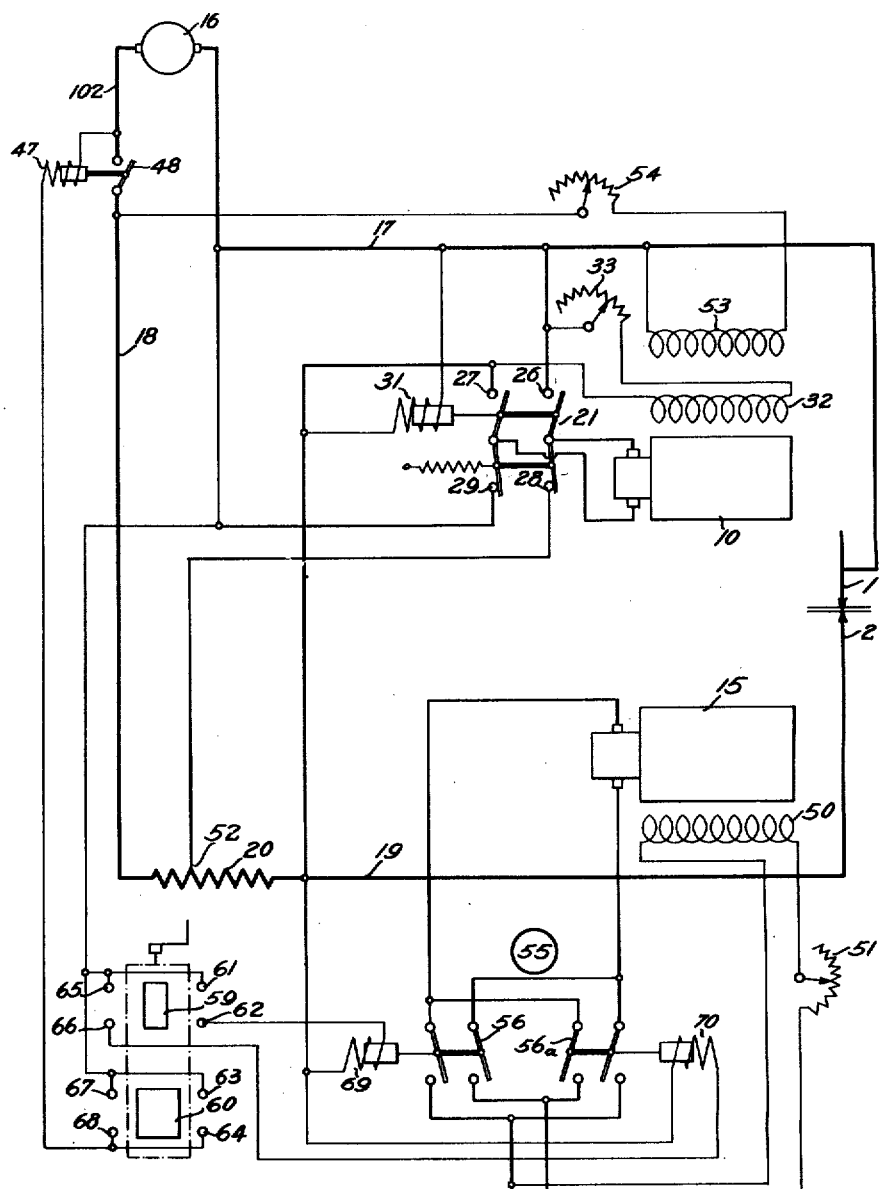

Patented Mar. 26, 1929.

1,706,842

UNITED STATES PATENT OFFICE.

GEORGE E. COOPER, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

WELDING MACHINE.

Application filed June 7, 1924. Serial No. 718,440.

This invention relates to the art of electric welding, and more particularly to a machine, or system which will form a weld automatically. The invention is particularly applicable in instances where an electrode is fed into an electric arc. It is desirable that the rate of feed of the electrode shall be maintained constant at any selected value, depending, among other things, on the nature and size of the electrode, the nature and size of the weld to be made, the speed at which it is desired to make the weld, and the voltage around the arc. It is an object of the invention to provide means whereby the electrode may be fed at a constant rate under one or more of the conditions named. A further object is to provide means whereby the arc may be automatically struck; and also the available energy at the arc regulated. Another object is to provide means whereby the electrode and the work may be relatively traversed, and whereby such traversing is automatically started, and not until after the arc has been struck. Still another object is to provide means whereby the traversing will be stopped when abnormal conditions obtain. A still further object is to provide a simple, reliable and efficient means for carrying out the various objects. Other objects will appear hereinafter as the description of the invention proceeds.

The novel features of the invention will appear from this specification and the accompanying drawings forming a part thereof showing several embodiments of the invention, and all these novel features are intended to be pointed out in the claims.

In the drawings:

Figs. 2, 3 and 4 are diagrammatic views of modifications.

Figure 1:
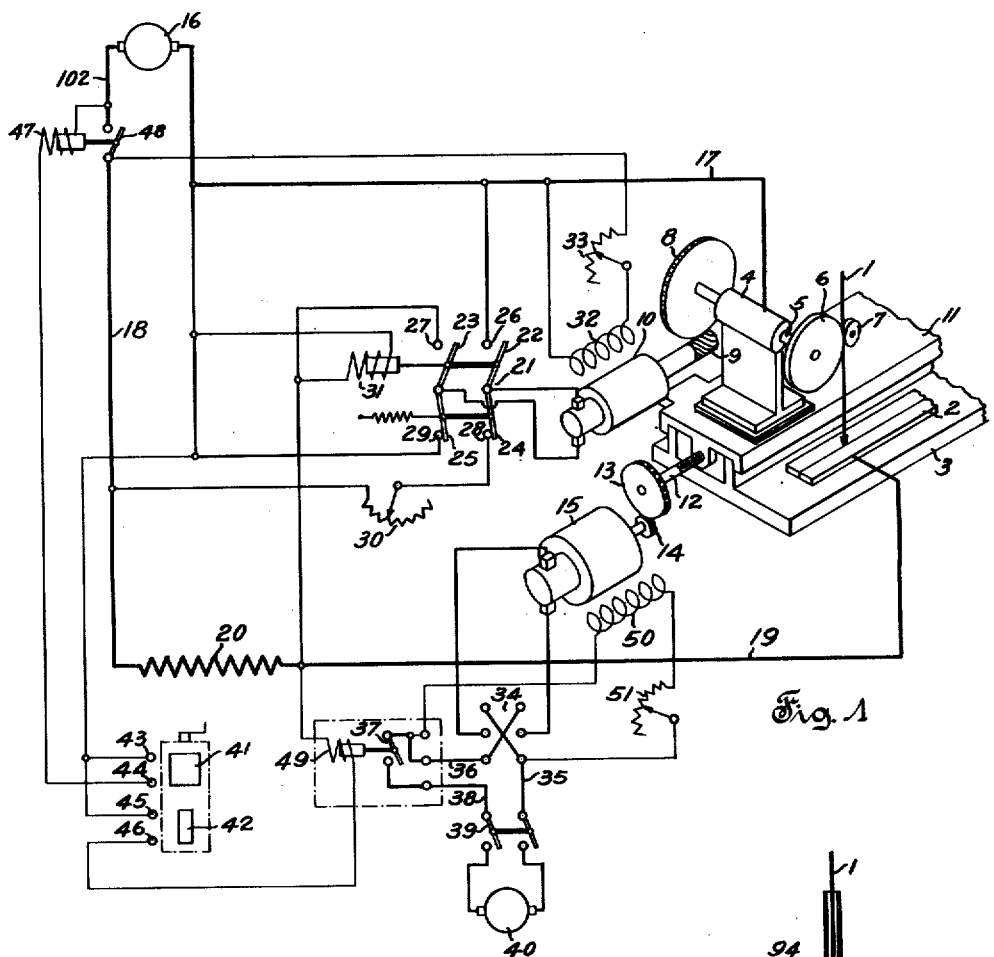
Fig. 1 is a diagrammatic showing, partly in diagrammatic perspective, illustrating one embodiment of the invention.

Referring to Fig. 1, a portion of the movable electrode 1 is diagrammatically shown in its operative position in the machine and with respect to the work 2, here shown as two strips of metal that are to be welded together by a longitudinal seam. It is of course understood that the work may be of many different kinds. The work 2 is here shown as supported on a bed plate 3. The movable electrode 1 is carried by a head 4 in turn carrying a shaft 5 for driving the feed wheel 6 between which and an idler wheel 7 the movable electrode 1 is disposed, whereby the electrode may be fed toward and away from the work. The shaft 5 is here shown as carrying a worm wheel 8 cooperable with a worm 9 carried by the shaft of a motor 10. The motor 10 is preferably mounted on plate 11 which here rests upon and is slidable with respect to the bed plate 3. The welding head 4 is also here shown as mounted on and insulated from the plate 11. By means of this arrangement the electrode 1 and the work 2 forming the other electrode may be traversed relatively to each other. It is of course understood that the welding head might be held stationary and the work 2 moved so as to relatively traverse the electrodes. In the illustrated embodiment the plate 11 is movable to and fro on the bed plate 3 by means of a relatively stationary screw shaft 12 carrying a gear 13 cooperating with a pinion 14 driven by a motor 15.

The welding machine may be fed by a suitable form of welding generator 16 here shown as having one terminal connected through conductor 17 to the welding head 4 and therefore to the electrode 1. The other terminal of the generator 16 is connectible through conductors 102, 18, 19 to the work electrode 2. The conductor 19 may of course be connected to the bed plate 3, current then passing through the latter to the work 2. Interposed in series with conductors 18, 19 is, preferably, a welding resistance 20 of suitable value. Current is fed to the armature of motor 10 through a reversing switch 21. This switch is here shown as of the double pole double throw type and provided with a movable switch member comprising two upper (as seen in the drawing) switch members 22, 23 and two lower switch members 24, 25. All of these members are here shown as movable in unison with each other. The switch members 22, 23 are cooperable with relatively stationary contacts 26, 27 respectively and the switch members 24, 25 are cooperable with relatively stationary contacts 28, 29 respectively. The contact 28 is shown as connected to conductor 18 through a rheostat 30. Contacts 25 and 26 are connected to conductor 17. Contact 27 is connected to conductor 19. The reversing switch is here shown as biased, as by a spring, to the position in which switch members 24, 25 are in contact with contacts 28, 29 respectively. The reversing switch may be actuated so that contact between switch members 22, 23 and contacts 26, 27 will be respectively established, and the lower connections broken, by means of an electromagnetic coil 31. The coil 31 has one terminal connected to conductor 17 and the other to conductor 19. The motor 10 is provided with a shunt field winding 32 one terminal of which is connected to conductor 17 and the other, through a rheostat 33, to conductor 18.

The motor 15 is here shown as controllable by means of an ordinary form of manual reversing switch 34, diagrammatically indicated. The reversing switch 34 permits of current being sent to the armature of motor 15 in either direction from the conductors 35, 36. Conductor 36 is here shown as connected to one terminal of an electromagnetic controller including a switch 37, the closure of which connects conductor 36 to a conductor 38. The conductors 35, 38 are connectible, through a switch 39, to a generator 40.

The welding operation of the machine is initiated by means of a controller including relatively movable contacts 41, 42 and stationary contacts 43, 44, 45, 46. Contact 41 is here shown as somewhat wider than contact 42 and when the controller is operated contact 41 will bridge contacts 43, 44 before contact 42 bridges contacts 45, 46. Contacts 43 and 45 are connected to conductor 17. Contact 44 is connected to one terminal of coil 47 adapted when energized to close a switch 48 to thereby connect conductor 18 to a terminal of generator 16 through conductor 102. The other terminal of coil 47 is connected to conductor 102. Contact 46 is connected to one terminal of a coil 49 adapted when energized to close the switch 37. The other terminal of coil 49 is connected to conductor 19. Motor 15 is provided with a shunt field winding 50 one terminal of which is suitably connected to generator 40, as by connection to conductor 36. The other terminal of winding 50 is connected through a rheostat 51 to the other terminal of generator 40, as through connection to conductor 35.

The operation of the machine illustrated in Fig. 1 is as follows. When the controller is operated so that contact 41 bridges contacts 43, 44, the coil 47 is energized to close switch 48 and thereby apply electromotive force to conductors 17, 18, 19. It may be assumed that the electrode 1 is a short distance from the work 2 and therefore out of electrical contact therewith. Upon energization of conductors 17 and 19, coil 31 is energized and reversing switch 21 operated to close the connection between switch members 22, 23 and contacts 26, 27 respectively. The armature of motor 10 is now fed with current from generator 16 through resistance 20 in such a direction that the motor will rotate to move the electrode 1 toward the work 2. As soon as the electrodes come in contact with each other, they and the conductors 17 and 19 form a low resistance path in shunt with coil 31 and this coil is therefore effectively deenergized. By reason of the bias of the reversing switch it then again returns to the position shown in Fig. 1 and the armature of motor 10 is then fed with current in a reverse direction, directly from conductors 17, 18, and consequently the electrode 1 immediately begins to move, at a comparatively fast rate dependent on the setting of rheostat 30, away from the work 2, thereby striking an arc between these electrodes. These operations take a comparatively short period of time and, meanwhile, contact 42 has been brought into contact with contacts 45, 46 to thereby energize coil 49, assuming that the electrodes are not actually in contact with each other inasmuch as coil 49 is also shunted by electrodes should they be in contact. Assuming that the reversing switch 34 has been closed in a direction corresponding to that in which it is desired that the welding head 4 shall move, and that switch 39 is also closed, the closure of switch 37 will feed motor 15 with current from generator 40 to thereby relatively traverse the electrodes in the desired direction. Meanwhile as the potential across the electrodes has been increasing due to the elongation of the arc, the voltage across coil 31 will rise and at a predetermined value the coil 31 will again close reversing switch 21 in its upper position whereupon motor 10 will again feed electrode 1 toward the work. Inasmuch as the voltage impressed upon the armature of motor 10 is, when the reversing switch is closed in its upper position, proportional to that across the electrodes the rate of feed will be proportional to that voltage and will be retarded or accelerated in accordance therewith so that the voltage across the electrodes and the arc will be maintained substantially constant. The desired rate of feed may be adjusted to a nicety by adjustment of the rheostat 33, or in a mechanical way (as will be hereinafter set forth in connection with Fig. 5) or both of these means together, depending upon the necessities.

Referring now to Fig. 2, this illustrates a modified form of electrical control system for the welding machine, in which parts corresponding to those of Fig. 1 have been given the same reference characters. In Fig. 2 the mechanical connection between motors 10 and 15 to the electrode 1 and the welding head 4 respectively have been omitted. As in Fig. 1, the motor 10 is controlled by a reversing switch 21 which is similarly connected except that contact 28 is connected to an intermediate point 52 on the welding resistance 20, the rheostat 30 being eliminated. The point of connection 52 may be adjustable if desired. The motor 10 is furthermore provided with a differential field winding 53 one terminal of which may be connected to conductor 17 and the other, through a rheostat 54, to conductor 18. The rheostat 54 may be omitted. Due to the differential field winding 53 the field control of motor 10 is rendered more sensitive.

In Fig. 2 the motor 15 is shown as controlled by a full automatic reversing controller 55 which may be of the dynamic braking type. This controller is here diagrammatically indicated as including a switch 56 which when closed will connect the armature of motor 15 to conductors 57, 58 connectible by switch 39 to generator 40. The controller further includes a switch 56ª which when closed will connect the armature of motor 15 to generator 40 in a reverse direction. The manually operated controller for controlling the automatic controller 55 includes contacts 59, 60, the latter being here shown as longer in the direction of its movement than the former. If the manual controller is moved to the right, contact 60 is adapted to bridge stationary contacts 63, 64 and contact 59 is similarly adapted to bridge contacts 61, 52. If moved toward the left contacts 59 and 60 will respectively bridge a pair of contacts 65, 66 and a pair of contacts 67, 68. Contacts 61, 63, 65 and 67 are connected to conductor 17. Contact 62 is connected to one terminal of a coil 69 adapted when energized to operate switch 56 to its closed position. The other terminal of coil 69 is connected to conductor 19. Contact 66 is connected to one terminal of coil 70 adapted when energized to close the switch 56ª. The other terminal of coil 70 is connected to conductor 19. Contacts 64, 68 are connected to one terminal of coil 47 for operating switch 48 in the manner as described in connection with Fig. 1.

The operation of the system illustrated in Fig. 2 is as follows. Assuming that the electrodes are to be relatively traversed in a direction corresponding to the closure of switch 56, the manual controller is thrown to the right thereby bridging contacts 63, 64 resulting in the closure of switch 48 and energization of the welding circuit. The reversing switch 21 then goes through its cycle of operations as described in connection with Fig. 1, the motor 10 being under the control of the field winding 52 and the differential field winding 53. Meanwhile a circuit through coil 69 will have been completed by contact 59 and the motor 15 will be energized when coil 69 is effectively energized similary to the effective energization of coil 49 in Fig. 1.

Figure 3:
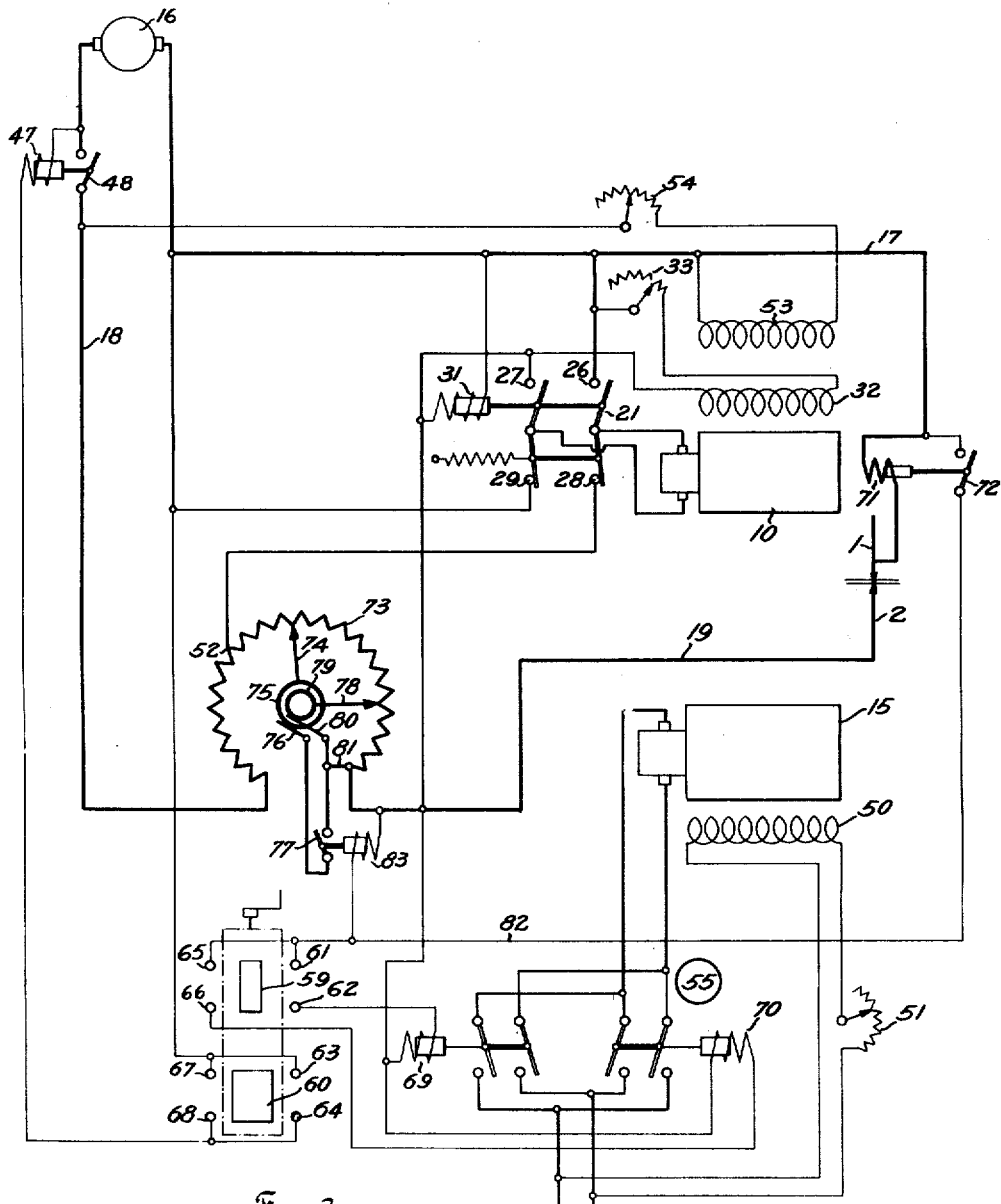

Referring now to Fig. 3, the electrodes 1 and 2 have connected in series therewith a coil 71 adapted when energized to close a switch 72, the purpose of which will be hereinafter set forth. The reversing switch 21 is connected and functions in the same manner as in Fig. 2. The point of connection 52 is however made in an adjustable welding resistant or rheostat 73 interposed between conductors 18 and 19. This rheostat is shown as provided with a contact arm 74 connected with a slip ring 75 with which cooperates a brush 76 in turn connected to one terminal of a switch 77. The rheostat is provided with another contact arm 78 connected to a slip ring 79 with which cooperates a brush 80. The brush 80 is connected to the other terminal of switch 77. It is therefore clear that closure of switch 77 results in short circuiting or eliminating that portion of the rheostat 73 lying between the contact arms 74, 78. The brush 80 is further connected by a conductor 81 to the conductor 19, or what is the same thing, to the right end of rheostat 73. As in Fig. 2, the motor 15 is controlled by an automatic electromagnetic controller 55. The contacts 62, 63, 64, 66, 67, 68 of the manual controller are connected as in Fig. 2. The contacts 61, 65 are however connected to a conductor 82 leading to one terminal of switch 72. The other terminal of this switch is connected to conductor 17. A coil 83 adapted, when energized, to close the switch 77, has one terminal connected through conductor 82 to switch 72 and the other terminal connected to conductor 19.

The operation of the system shown in Fig. 3 is as follows. Assuming that the manual controller is moved to the right so that contact 60 bridges contacts 63, 64, the switch 48 will be closed and the conductors 17, 19 energized. The coil 31 will close the upper contacts of reversing switch 21 so that motor 10 will feed electrode 1 toward electrode 2. When these electrodes come in contact with each other coil 31 is effectively deenergized and reversing switch 21 again closes its lower contacts. At the same time, by reason of current flow through electrodes 1, 2, coil 71 is energized and closes switch 72 and coil 83 is therefore connected across the electrodes and responsive to the potential difference therebetween. Coil 83 will however not be effectively energized until electrode 1 has again moved away from electrode 2 to strike an arc. When the potential across this arc has reached a predetermined value the switch 77 will close thus short circuiting a portion of rheostat 73, thereby increasing the amount of energy available at the arc after the same has been struck. Meanwhile coil 31 has also been energized so that motor 10 again feeds electrode 1 toward electrode 2 at the desired rate. It will be noted that the circuit of coil 69 of controller 55 extends from switch 72 through conductor 82, contacts 61, 59, 62, through coil 69 to conductor 19. It is therefore clear that motor 15 cannot start until there is current flow through electrodes 1, 2 for the reason that until that occurs switch 72 will not be closed and coil 69 cannot be energized even though contact 59 bridges contacts 61, 62. It is therefore not essential that contact 59 be shorter than contact 60. Furthermore, assuming that the machine is in operation and producing a weld, the motor 15 will stop if the arc at the electrodes should break for the reason that coil 71 would then be deenergized and switch 72 would open thereby deenergizing coil 69.

By adjusting the arm 78 of rheostat 73 it is possible to vary the amount of resistance in the electrode circuit at the time that the electrodes come in contact with each other. Adjustment of arm 74 permits of changing the resistance included between arms 74 and 78 and therefore the amount of resistance which will be eliminated when the switch 77 is operated. It is therefore possible to predetermine the amount of resistance which will be automatically eliminated and therefore the amount of energy which will be available at the electrodes after the arc has been struck.

Figure 4:
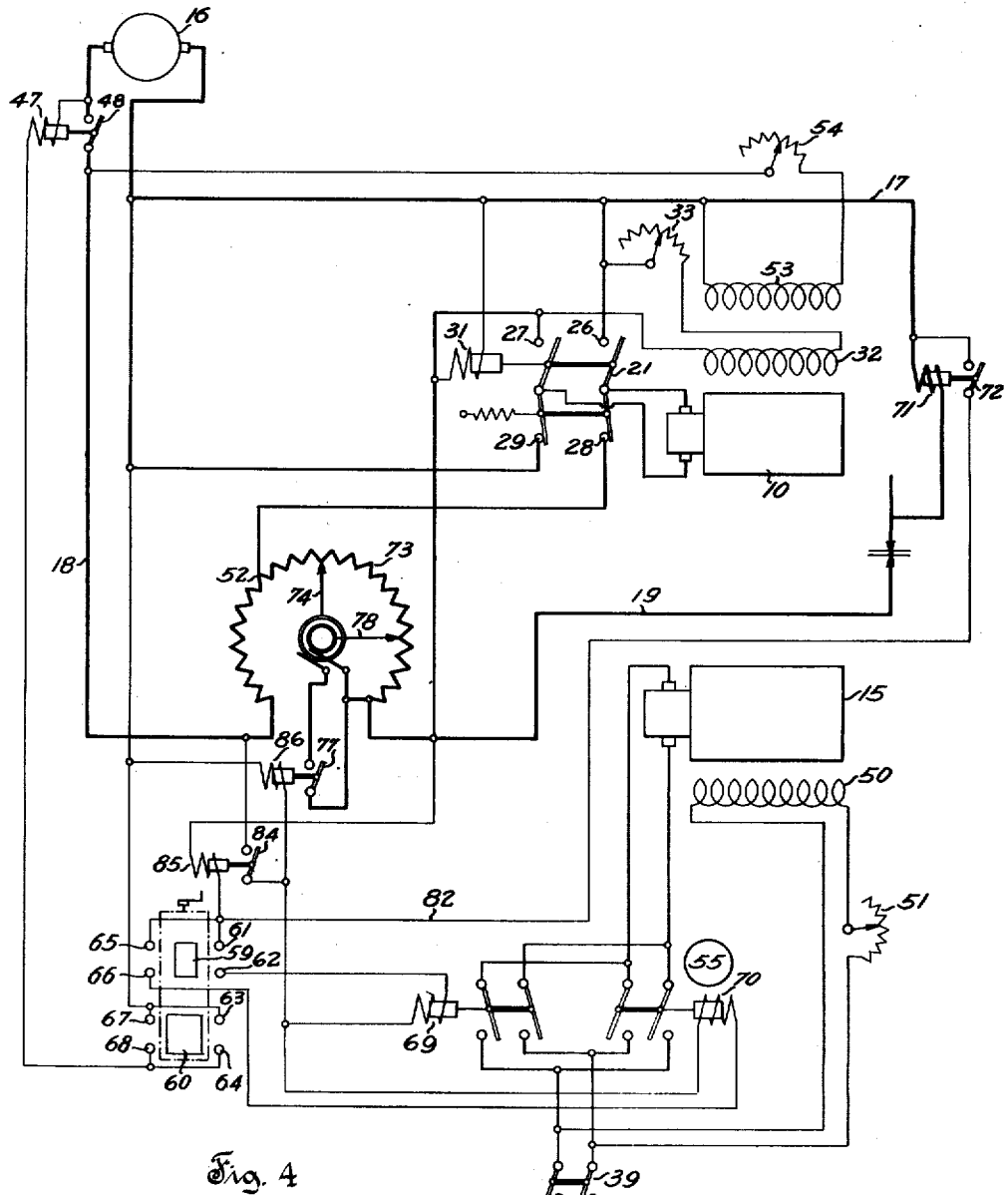

Referring now to Fig. 4, the connections of the reversing switch 21 and the rheostat 73 are the same as in Fig. 3. The switch 77 is however controlled in a somewhat different manner, and connections of the manual controller are somewhat different as will now appear. The contacts 61 to 68 inclusive of the manual controller are the same in Fig. 3. Coil 69 of controller 55 is however controlled by an additional relay or switch 84. One terminal of switch 84 is connected to conductor 18 and the other to one terminal of coil 69, the remaining terminal of the latter being connected to contact 62 as in Fig. 3. One terminal of coil 70 is also here shown as connected to the same terminal of switch 84 as that to which coil 69 is connected. The other terminal of coil 70 is connected to contact 66 as in Fig. 3. Switch 84 is adapted to be closed by a coil 85 when energized. Coil 85 has one terminal connected, through conductor 82 to switch 72, and the other terminal to conductor 19.

The operation of the system shown in Fig. 4 is as follows. Assuming the manual controller to be moved to the right to thereby close switch 48 and energize the electrodes, the reversing switch 21 will go through its cycle of operations as hereinbefore described. When current flows through the electrodes by reason of their contact with each other, switch 72 will be closed but coil 69 will not be energized until switch 84 has been closed. Closure of switch 84 will occur when the potential across the electrodes, after the arc has been struck, effectively energizes coil 85. Coil 69 will then be energized directly from generator 16 or other source of current through conductor 18 through switch 84 through coil 69, contacts 62, 59, 61, conductor 82, switch 72 to conductor 17. Such energization of coil 69 (or coil 70 as the case may be) is desirable, among other reasons, because these coils will then be energized directly from the full voltage of generator 16, or other suitable source of current, and especially constructed coils will not be necessary. In other words, a standard form of controller may be utilized.

Figure 5:
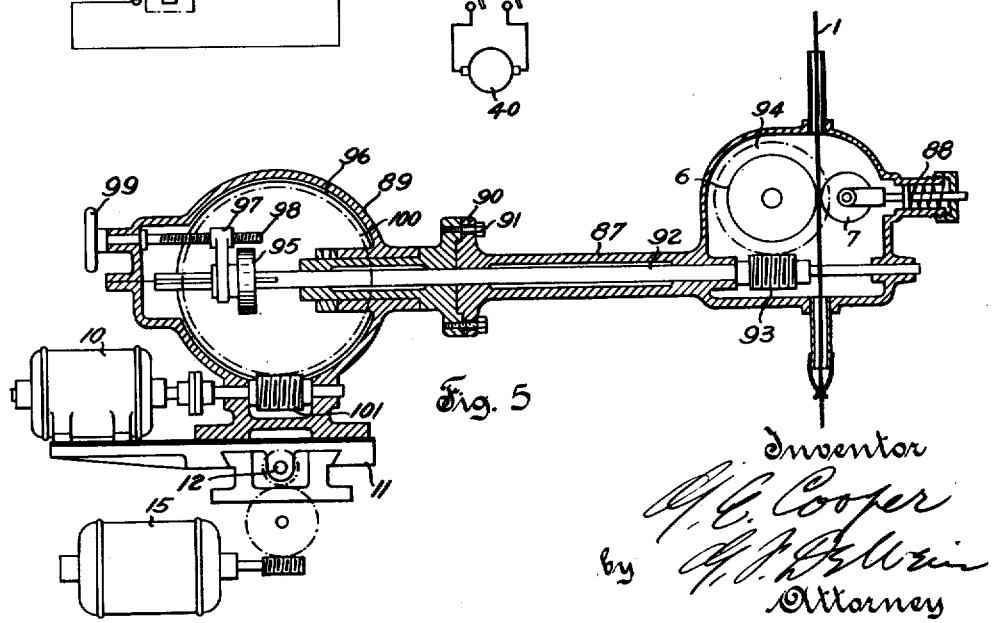
Fig. 5 is a vertical sectional view, partly diagrammatic, of one form that the movable electrode carrying and feeding means may take.

Referring to Fig. 5, this shows a movable electrode carrying and feeding means which may be utilized when it is desirable to adjust the rate of feed of the electrode in a mechanical way. The welding wire or electrode is here shown as passing through suitable openings in a head 87. As in Fig. 1, the welding wire 1 may be driven by a feed wheel 6 and idler wheel 7 which may be pressed against the electrode which is in turn pressed against the feed wheel 6, by means of a spring 88.

The head 87 may be adjustably mounted on a support or housing 89. The construction as shown is such that the head 87 may be rotatably adjusted about its axis and clamped in any desired angular position, as by means of bolts 91 in threaded engagement with a flange on the housing 89. The bolts 91 pass through circumferentially extending slots 90 in a flange on the head 87.

The feed wheel 6 is driven by means of a rotatable shaft 92 carrying at one end a worm 93 in engagement with a worm wheel 94 mounted on the same shaft with the feed wheel 6. The other end of shaft 92 has associated therewith a friction wheel 95 which is feathered on the shaft so that it may be adjusted at different radial distances from the center of a friction disk 96. The friction wheel 95 is here shown as adjustable to various positions by means of a member on 97 in threaded engagement with a relatively stationary screw 98. The screw 98 passes through the housing 89 and is provided with a hand wheel 99. The friction disk 96 is driven by means of a worm 100 in turn driven by a worm 101 which may be rotated by means of motor 10. The motor 10 corresponds to the similarly numbered motor in Fig. 1, for example.

The housing 89 is insulated from the bed plate 11 which may be traversed by means of motor 15 is described in connection with Fig. 1.

It should be understood that it is not desired to limit the invention to the exact details of construction shown and described, for obvious modifications may occur to persons skilled in the art.

It is claimed and desired to secure by Letters Patent:

1. In an automatic welding machine having a movable electrode cooperable with work forming the other electrode, means for starting and maintaining an arc between said electrodes comprising means including a motor, for feeding said movable electrode, having an armature circuit connected across said electrodes, means for reversing the direction of rotation of said motor when said electrodes come into contact to thereby draw an arc and for again reversing the direction of rotation of said motor when the potential across the arc reaches a predetermined value.

2. An automatic welding machine having a movable electrode cooperable with work forming the other electrode, means for starting and maintaining an arc between said electrodes comprising means including a motor, for feeding said movable electrode, having an armature circuit connected across said electrodes, means responsive to the potential across said electrodes for reversing the direction of rotation of said motor when a predetermined minimum potential obtains across said electrodes and for again reversing the direction of rotation of said motor when the potential across said electrodes rises to a predetermined value.

3. In an automatic welding machine having a movable electrode cooperable with work forming the other electrode, means for controlling the arc between said electrodes comprising means including a motor for feeding said movable electrode, said motor having an armature circuit connected across said electrodes, and means for controlling said motor responsive to the potential across said electrodes.

4. In an automatic welding machine having a movable electrode cooperable with work forming the other electrode, means for feeding said movable electrode to and from the work to strike an arc therebetween, and means for relatively traversing said electrodes including a motor, an electromagnetically operated reversing switch for controlling said motor controlled in response to a predetermined potential across said arc.

5. In an automatic welding machine having a movable electrode cooperable with work forming the other electrode, means for feeding said movable electrode to and from the work to strike an arc therebetween, means for relatively traversing said electrodes controlled in response to a predetermined potential across said arc, and a master controller for controlling the sequence of operation of the aforesaid means so that said electrodes will not be relatively traversed until the arc has been struck.

6. In an automatic welding machine having a movable electrode cooperable with work forming the other electrode, means including a motor for controlling said movable electrode, said motor having a shunt field winding, and a circuit including a differential shunt field winding connected across said electrodes.

7. In an automatic welding machine having a movable electrode cooperable with work forming the other electrode, means including a motor for controlling said electrode, said motor having a shunt field winding, and circuits including a differential shunt field winding and an armature respectively connected across said electrodes.

8. In a welding machine, a movable electrode cooperable with work forming the other electrode, means including a motor for feeding said movable electrode toward and away from said work, a supply circuit for said electrode, a resistance in series with said supply circuit, a reversing switch in the circuit of said motor, means for connecting said motor through said reversing switch in one position to the supply side of said resistance and in the other position of said reversing switch to the electrode circuit on the electrode side of said resistance.

9. In an automatic welding machine having a movable electrode cooperable with work forming the other electrode, means for controlling the movement of said movable electrode to and from said work, means including a motor for relatively traversing said electrodes, and means including a relay having an operating coil in series with the arc between said electrodes for stopping said motor in response to breakage of said arc.

10. In an automatic welding machine having a movable electrode cooperable with work forming the other electrode, means for controlling the movement of said movable electrode to and from said work, means including a motor for relatively traversing said electrodes, a controller for said motor having an operating magnet responsive to the potential across said electrodes, and means responsive to current through said electrodes including an operating coil in series with said electrodes for controlling said magnet.

11. In combination, a movable electrode cooperable with a work electrode to produce an arc, a resistance in series with the circuit of said electrodes, means including a relay coil for eliminating a portion of said resistance responsive to the potential around said electrodes, and means responsive to the current through said electrodes for closing the circuit of said relay coil when the current through said electrodes rises to a predetermined value.

12. In combination, a movable electrode cooperable with a work electrode to produce an arc, means for predetermining the flow of electrical energy through said electrodes when they are in contact, means for automatically increasing the energy available at the electrodes after the arc is struck, and means including a single rheostat having two movable contacts cooperable therewith whereby the values of either of the aforesaid energy quantities may be adjusted at will.

13. In combination, a movable electrode cooperable with a work electrode to produce an arc, means for predetermining the flow of electrical energy through said electrodes when they are in contact, means responsive to the potential across said electrodes for automatically increasing the energy available at the electrodes after the arc is struck, and means including a single rheostat having two movable contacts cooperable therewith whereby the values of either of the aforesaid energy quantities may be adjusted at will.

14. In an automatic welding machine having a movable electrode cooperable with work forming the other electrode, means for feeding said movable electrode to and from the work to strike an arc therebetween, means for relatively traversing said electrodes, and means including a master controller for said feeding and traversing means for preventing movement of said traversing means until said arc has been struck.

15. In an automatic welding machine having a movable electrode cooperable with work forming the other electrode, means for feeding said movable electrode to and from the work to strike an arc therebetween, means for relatively traversing said electrodes, means including a master controller for said feeding and traversing means for preventing movement of said traversing means until said arc has been struck, and means for stopping said traversing means responsive to arc breakage.

16. In an automatic welding machine having a movable electrode cooperable with work forming the other electrode, means for feeding said movable electrode to and from the work to strike an arc therebetween, means for applying electromotive force to said electrodes and said feeding means to cause the movable electrode to feed into contact with the work, a reversing switch controlling said feeding means for reversing the feed to draw an arc between said electrodes, means for relatively traversing said electrodes when the potential across said arc rises to a predetermined value after said arc has been struck, and means for feeding said movable electrode into the arc after it is formed.

17. In an automatic welding machine having a movable electrode cooperable with work forming the other electrode, means for feeding said movable electrode to and from the work to strike an arc therebtween, means for applying electromotive force to said electrodes and said feeding means to cause the movable electrode to feed into contact with the work, means for reversing the feed to draw an arc between said electrodes, means for relatively traversing said electrodes when the potential across said arc after the same has been struck rises to a predetermined value, and means for feeding said movable electrode into the arc after it is formed at a rate to maintain the potential across said arc at a predetermined selected value.

18. In an automatic welding machine having a movable electrode cooperable with work forming the other electrode, means for feeding said movable electrode to and from the work to strike an arc therebetween, means including a motor for relatively traversing said electrodes, a controller for said motor having an operating magnet, and means for controlling said magnet including a relay responsive to the potential across said electrodes and a relay responsive to the current through said electrodes.

19. In an automatic welding machine feedable from a source of current and having a movable electrode cooperable with work forming the other electrode, means for feeding said movable electrode to and from the work to strike an arc therebetween, means including a motor for relatively traversing said electrodes, a controller for said motor having an operating magnet connectible directly to said source of current, and means for controlling the connection of said magnet including a relay responsive to the potential across said electrodes and a relay responsive to the current through said electrodes.

20. In an automatic welding machine feedable from a source of current and having a movable electrode cooperable with work forming the other electrode, means for feeding said movable electrode to and from the work to strike an arc therebetween, means including a motor for relatively traversing said electrodes, a controller for said motor having an operating magnet connectible directly to said source of current, means for increasing the energy available at said arc after it is struck, and means for controlling said last named means and the connection of said magnet, including a relay responsive to the potential across said electrodes.

21. In an automatic welding machine feedable from a source of current and having a movable electrode cooperable with work forming the other electrode, means for feeding said movable electrode to and from the work to strike an arc therebetween, means including a motor for relatively traversing said electrodes, a controller for said motor having an operating magnet connectible directly to said source of current, means for increasing the energy available at said arc after it is struck, means for controlling said last named means and the connection of said magnet, including a relay responsive to the potential across said electrodes, and a relay responsive to the current through said electrodes.

22. In an automatic welding machine having a movable electrode, means for feeding said electrode comprising a motor, means for transmitting motion from said motor to said electrode, and self-contained adjustable mechanical means for adjusting the speed of said feed while the machine is in operation.

23. In an automatic welding machine having a movable electrode, a head for carrying said electrode, a support for said head, a shaft passing through said head and into said support, means whereby said head may be adjusted concentrically about said shaft, a friction disk within said support, a wheel on said shaft cooperable with said disk, and means for driving said disk.

24. In an automatic welding machine, a movable electrode cooperable with work forming the other electrode, means for feeding said movable electrode toward and away from said work, including a motor connected across said electrodes when the movable electrode is being fed toward the work and responsive to a higher potential when said movable electrode is being fed away from said work.

25. In an automatic welding machine having a movable electrode, a head for carrying said electrode, means in said head for engaging said electrode and causing it to move, a tubular extension for said head, a rotatable shaft extending through said tubular extension and cooperable with said electrode engaging means, a support for said tubular extension, means whereby said tubular extension may be adjusted concentrically about said shaft relatively to said support, a means on said support for driving said shaft.

26. In a welding machine, a movable electrode cooperable with work forming the other electrode, means including a motor for feeding said movable electrode toward and away from said work, a supply circuit for said electrode, a resistance in series with said supply circuit, a reversing switch in the circuit of said motor, means for connecting said motor through said reversing switch in one position to the supply side of said resistance and in the other position of said reversing switch to the electrode circuit on the electrode side of said resistance, means whereby said reversing switch is biased to said first named position, and an electromagnet connected across said electrodes for operating said switch to the other position.

In testimony whereof, the signature of the inventor is affixed hereto.

GEORGE E. COOPER.

DISCLAIMER 1,706,842.—*George E. Cooper*, West Allis, Wis. WELDING MACHINE. Patent dated March 26, 1929. Disclaimer filed November 5, 1932, by the assignee, *Allis-Chalmers Manufacturing Company*.

Hereby enters this disclaimer to that part of the claim in said specification which is in the following words, to wit:

"3. In an automatic welding machine having a movable electrode cooperable with work forming the other electrode, means for controlling the arc between said electrodes comprising means including a motor for feeding said movable electrode, said motor having an armature circuit connected across said electrodes, and means for controlling said motor responsive to the potential across said electrodes."

"25. In an automatic welding machine having a movable electrode, a head for carrying said electrode, means in said head for engaging said electrode and causing it to move, a tubular extension for said head, a rotatable shaft extending through said tubular extension and cooperable with said electrode engaging means, a support for said tubular extension, means whereby said tubular extension may be adjusted concentrically about said shaft relatively to said support, a means on said support for driving said shaft."

[*Official Gazette December 6, 1932.*]

23. In an automatic welding machine having a movable electrode, a head for carrying said electrode, a support for said head, a shaft passing through said head and into said support, means whereby said head may be adjusted concentrically about said shaft, a friction disk within said support, a wheel on said shaft cooperable with said disk, and means for driving said disk.

24. In an automatic welding machine, a movable electrode cooperable with work forming the other electrode, means for feeding said movable electrode toward and away from said work, including a motor connected across said electrodes when the movable electrode is being fed toward the work and responsive to a higher potential when said movable electrode is being fed away from said work.

25. In an automatic welding machine having a movable electrode, a head for carrying said electrode, means in said head for engaging said electrode and causing it to move, a tubular extension for said head, a rotatable shaft extending through said tubular extension and cooperable with said electrode engaging means, a support for said tubular extension, means whereby said tubular extension may be adjusted concentrically about said shaft relatively to said support, a means on said support for driving said shaft.

26. In a welding machine, a movable electrode cooperable with work forming the other electrode, means including a motor for feeding said movable electrode toward and away from said work, a supply circuit for said electrode, a resistance in series with said supply circuit, a reversing switch in the circuit of said motor, means for connecting said motor through said reversing switch in one position to the supply side of said resistance and in the other position of said reversing switch to the electrode circuit on the electrode side of said resistance, means whereby said reversing switch is biased to said first named position, and an electromagnet connected across said electrodes for operating said switch to the other position.

In testimony whereof, the signature of the inventor is affixed hereto.

GEORGE E. COOPER.

DISCLAIMER 1,706,842.—*George E. Cooper*, West Allis, Wis. WELDING MACHINE. Patent dated March 26, 1929. Disclaimer filed November 5, 1932, by the assignee, *Allis-Chalmers Manufacturing Company*.

Hereby enters this disclaimer to that part of the claim in said specification which is in the following words, to wit:

"3. In an automatic welding machine having a movable electrode cooperable with work forming the other electrode, means for controlling the arc between said electrodes comprising means including a motor for feeding said movable electrode, said motor having an armature circuit connected across said electrodes, and means for controlling said motor responsive to the potential across said electrodes."

"25. In an automatic welding machine having a movable electrode, a head for carrying said electrode, means in said head for engaging said electrode and causing it to move, a tubular extension for said head, a rotatable shaft extending through said tubular extension and cooperable with said electrode engaging means, a support for said tubular extension, means whereby said tubular extension may be adjusted concentrically about said shaft relatively to said support, a means on said support for driving said shaft."

[*Official Gazette December 6, 1932.*]